Nov. 5, 1940.  P. H. CRESWELL ET AL  2,220,316
HIGHWAY MARKING
Filed Sept. 23, 1938  6 Sheets-Sheet 3
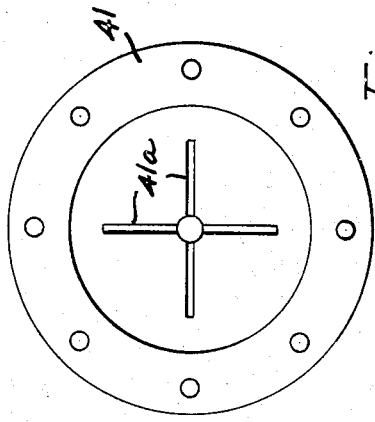
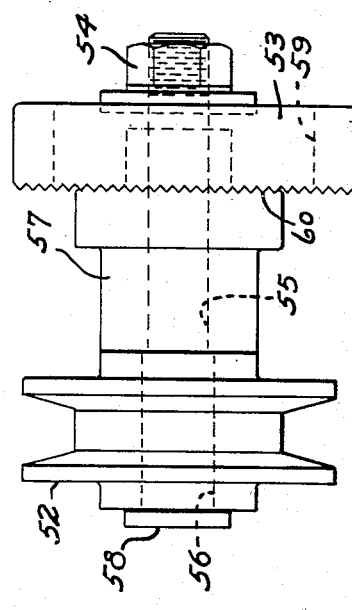
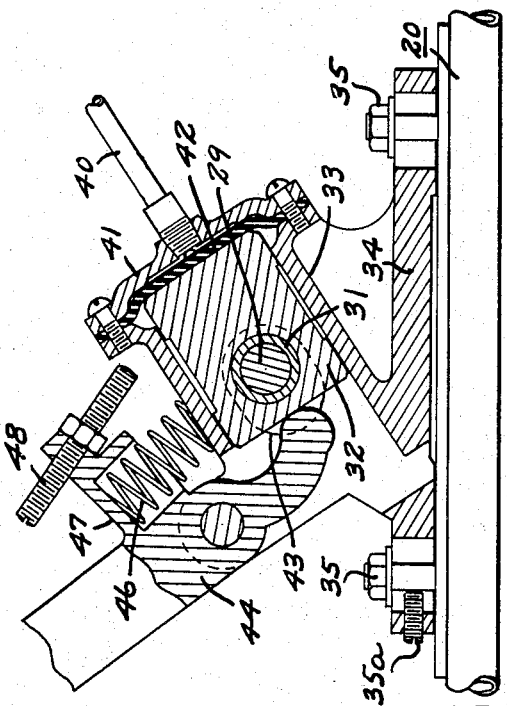
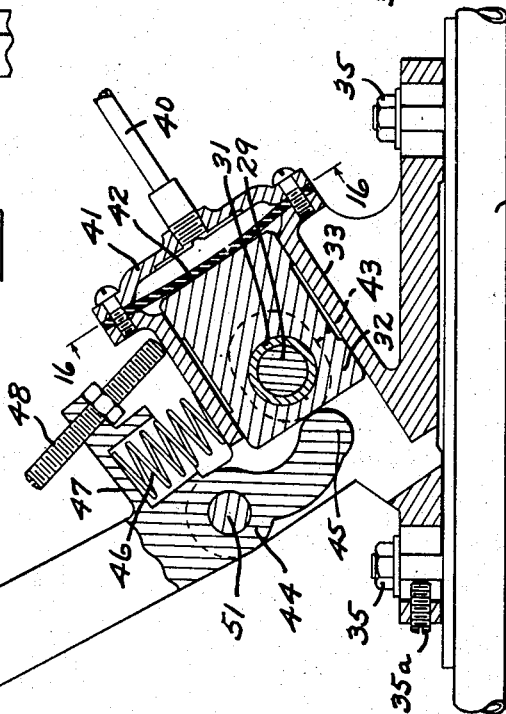
INVENTOR
PAUL CRESWELL
BY  ROBERT A. KELLY
ATTORNEYS

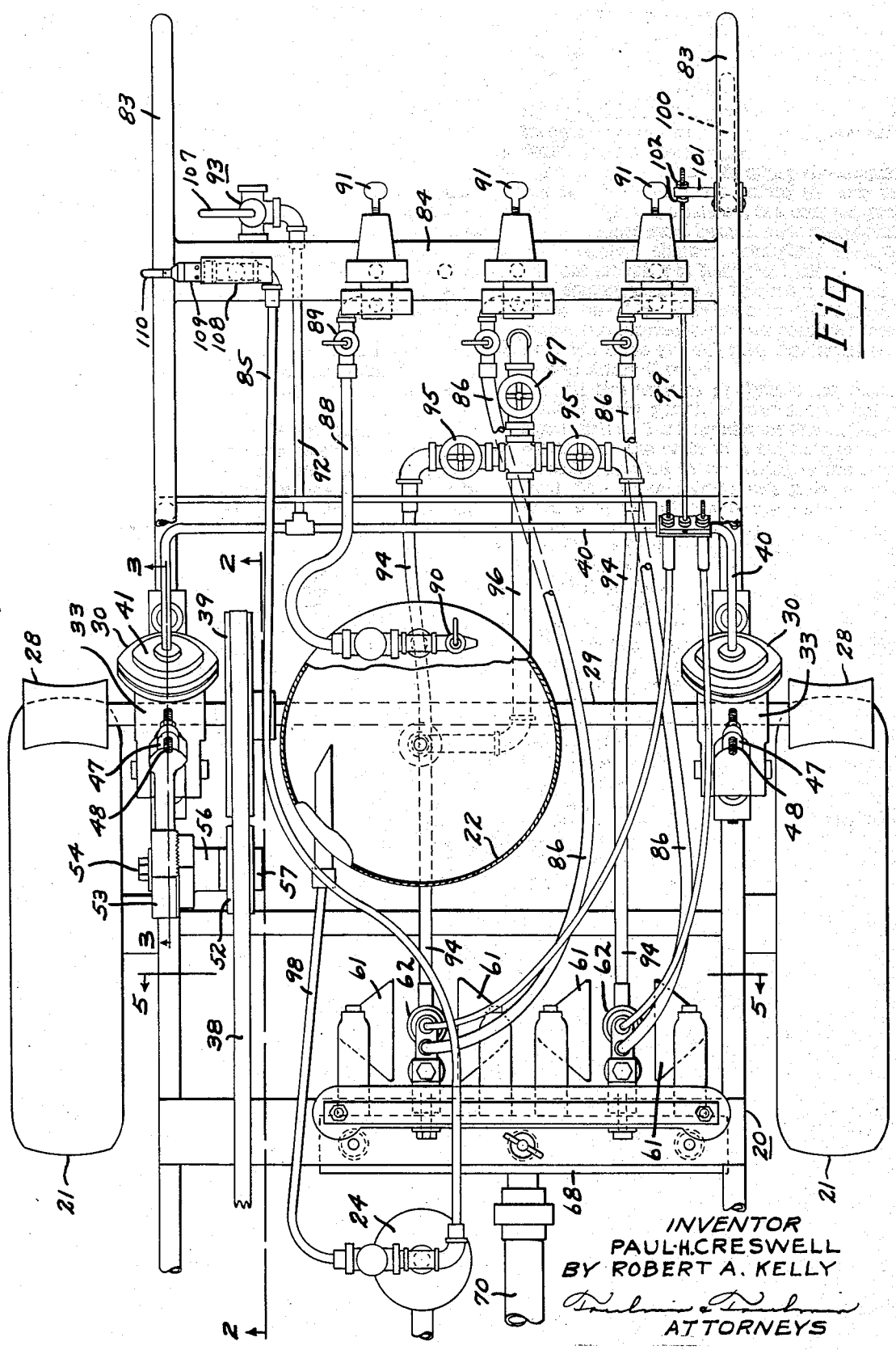

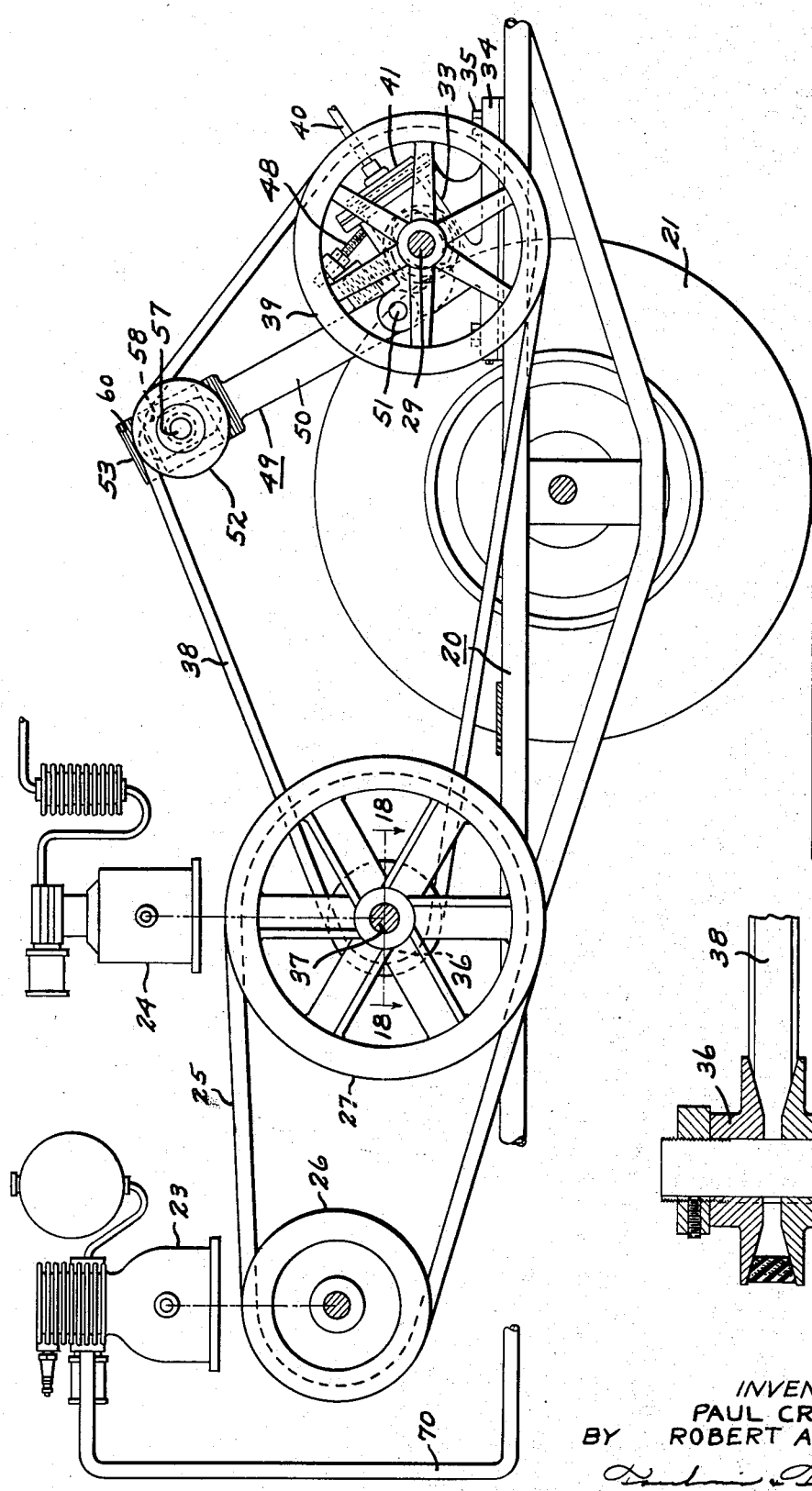

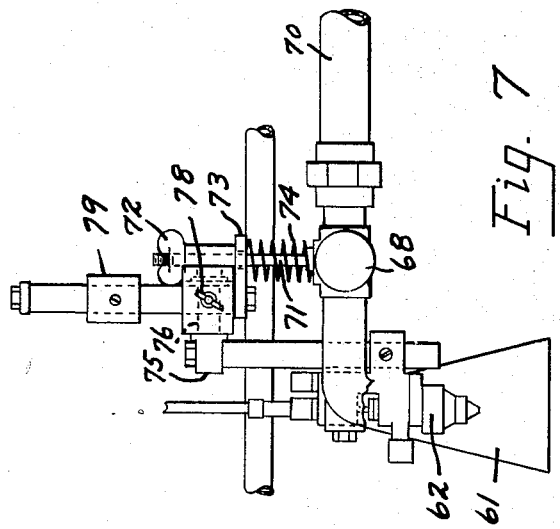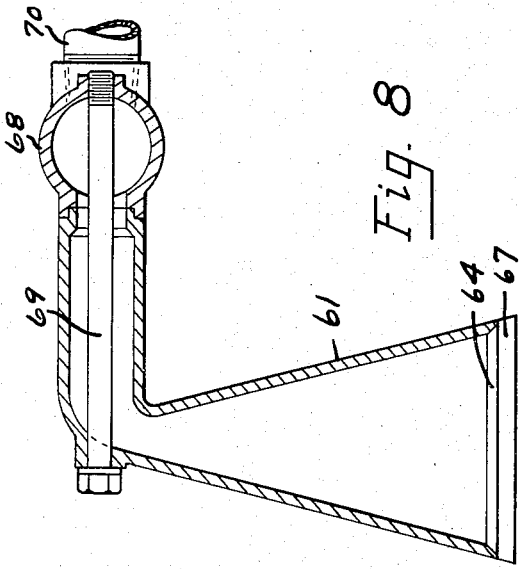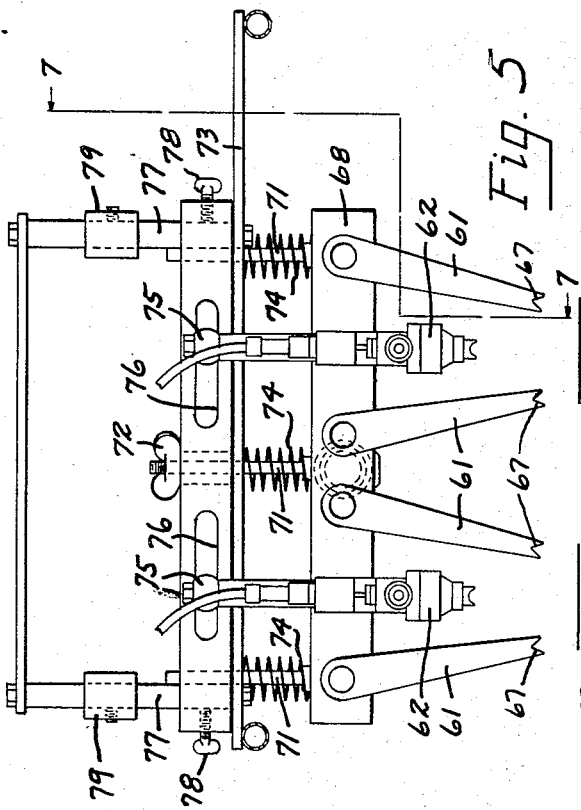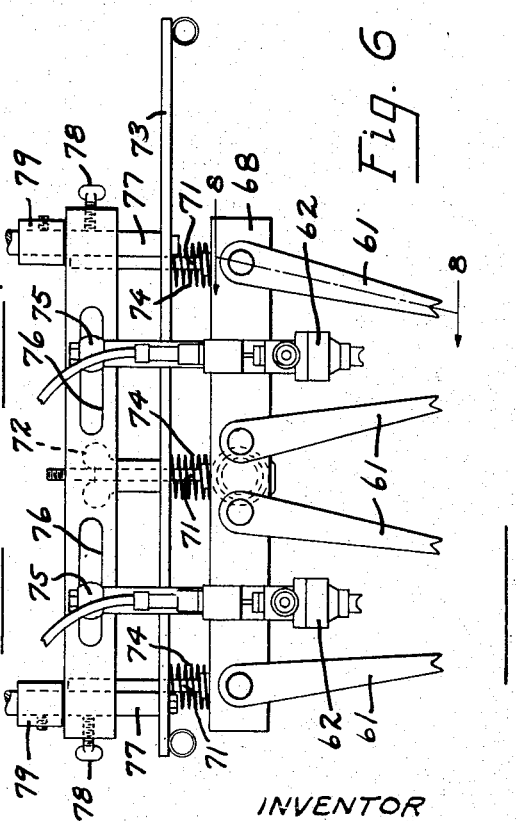

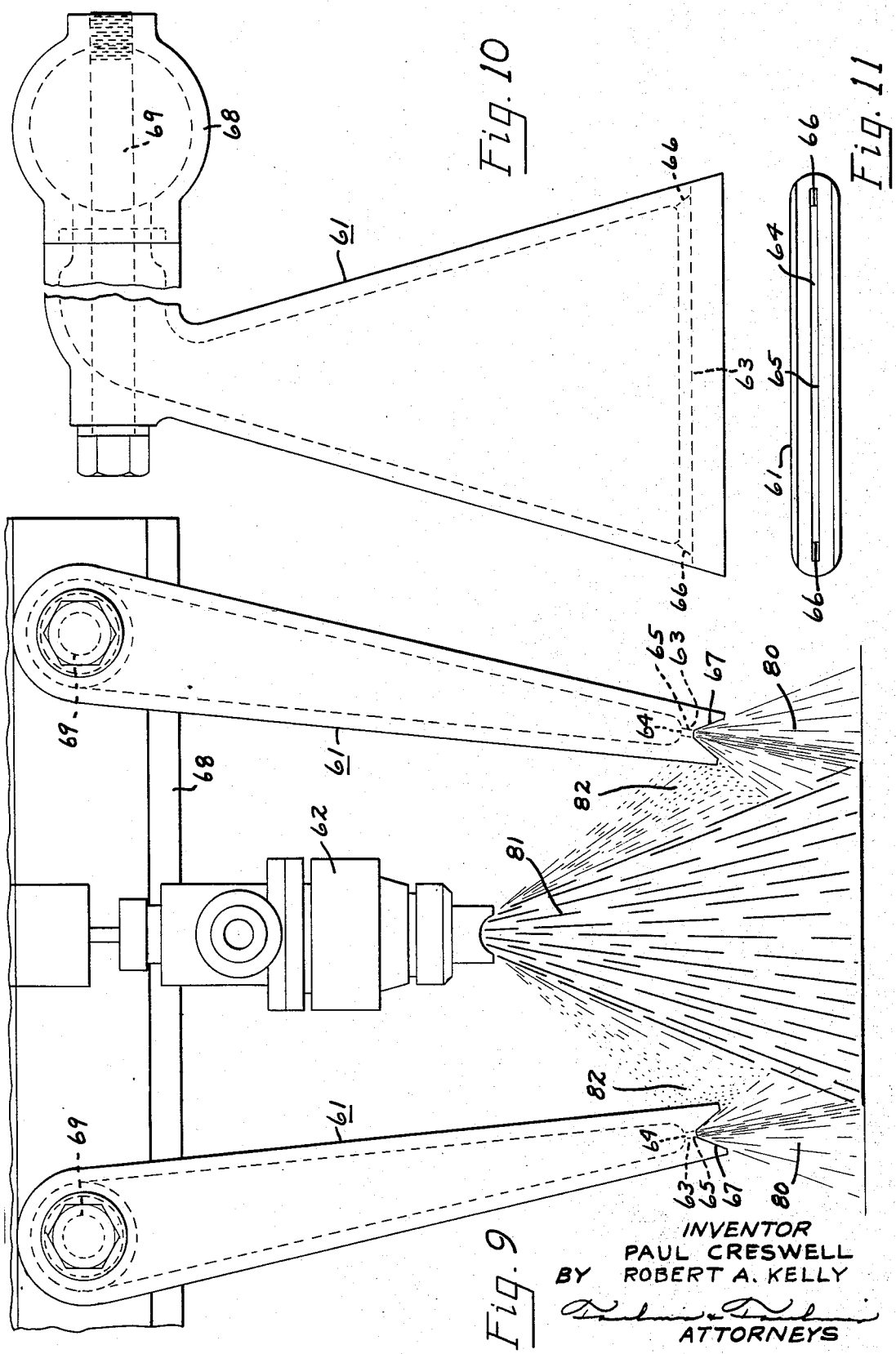

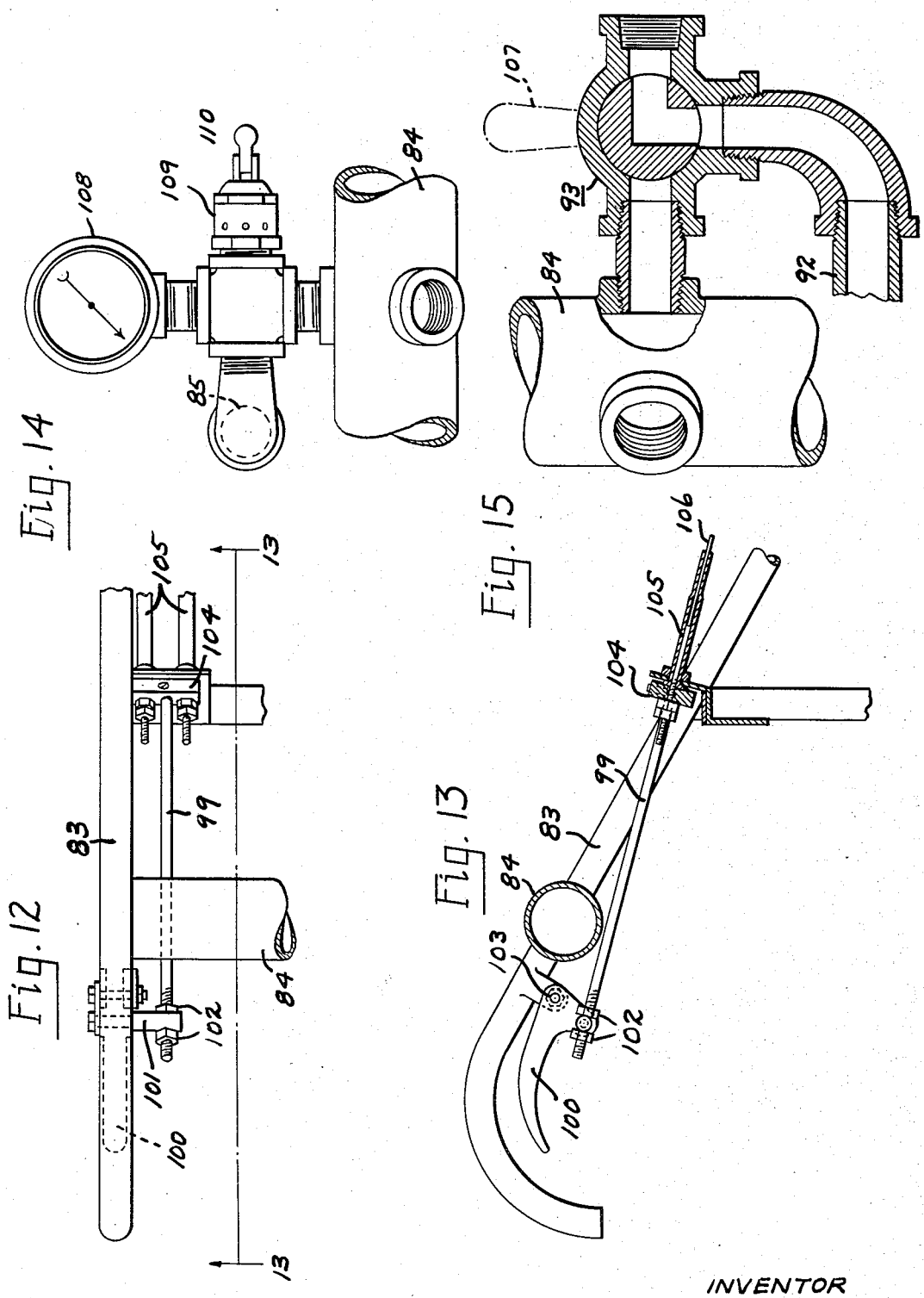

Patented Nov. 5, 1940

2,220,316

UNITED STATES PATENT OFFICE 2,220,316

HIGHWAY MARKING

Paul H. Creswell and Robert A. Kelly, Xenia, Ohio, assignors to Robert A. Kelly and Paul H. Creswell, Xenia, Ohio, a partnership doing business as Kelly-Creswell Company Application September 23, 1938, Serial No. 231,406

3 Claims. (Cl. 91—12)

This invention relates to marking devices and more particularly to an improved machine for marking or painting lines on streets and highways. Other uses include the laying out of athletic grounds, aviation fields and other surfaces requiring marking.

Heretofore various types of devices have been used for marking lines on highways, streets and the like, for the purpose of defining traffic lanes, comprising gravity fed revolving brushes and paint spraying apparatus utilizing the dragging or disk type of guide plates for endeavoring to maintain the edges of the lines sharply defined.

These older types of devices are slow, costly to operate, wasteful of paint or marking material, and the lines formed therewith lack uniformity. Aside from this the mechanical guide plates used for confining the spray to the desired width of line rapidly wear out from coming in contact with the pavement or road surface.

It is an object of this invention to provide an improved marking machine which eliminates the above defects and provides a highly improved, economical and efficient marking device.

Another object is to provide a machine which will place marks, lines, stripes or indicia on a surface continuously or intermittently, as desired.

Another object is to provide a marker which will produce either a single or double line of predetermined width and of sharply defined edges continuously or intermittently on a surface.

Another object is to provide a device of this nature which is adapted to be drawn or power driven over the surface to be marked to produce either a single or double line marking.

Another object is to provide a marking machine utilizing gaseous media for producing uniform, keen cut, straight edged lines without the use of mechanical guides which contact the surface being marked.

Another object of this invention is to provide a marking device which will produce a sharply defined line or design on a surface regardless of whether the surface is rough or smooth.

A still further object of this invention is to provide a machine which will confine the marking material to the desired width of the line and will eliminate dripping of the marking material at the end of the line or on terminating the mark.

And yet another object is to provide a marking device wherein fluid pressure is used to keep both the margin of the lines straight and the driving wheels of the machine locked together so as to prevent wabbling of the machine during movement. In this way a uniform straight-edged line can be laid down over rough or smooth surfaces.

This invention has other objects in view which will be apparent hereinafter in the detailed description thereof taken in connection with the drawings.

In the drawings:

Figure 1 is an elevation view of the marking machine of this invention;

Figure 2 is a view taken on the line 2—2 of Figure 1, looking in the direction of the arrows, with certain parts diagrammatically illustrated;

Figure 3 is a section taken on the line 3—3 of Figure 1, looking in the direction of the arrows, with certain parts broken away to more clearly illustrate the construction of the air operated clutch;

Figure 4 is a similar view of the clutch mechanism illustrated in Figure 3, showing the parts in declutched position;

Figure 5 is a view taken on the line 5—5 of Figure 1, looking in the direction of the arrows, showing the arrangement of the spray head nozzles and air curtains;

Figure 6 is a similar view to Figure 5, showing the position of the spray heads and air curtains when making a single wide line;

Figure 7 is a detail view taken on the line 7—7 of Figure 5, looking in the direction of the arrows;

Figure 8 is a sectional view through one of the air curtains, taken on the line 8—8 of Figure 6;

Figure 9 is a detail view of the arrangement of the spray nozzle and air curtains illustrating the path which the paint or marking fluid and air take during operation of the device;

Figure 10 is a side elevation view of one of the air curtain means;

Figure 11 is a view looking into the open end thereof;

Figure 12 is a detail view of the paint and inter-spray head volume control means;

Figure 13 is a similar view thereof taken on the line 13—13 of Figure 12, looking in the direction of the arrows;

Figure 14 is a detail view of the chamber air gage and relief valve;

Figure 15 is a detail view of the clutch control lever with certain parts in section;

Figure 16 is a detail view of the clutch mechanism taken on the line 16—16 of Figure 3, looking in the direction of the arrows;

Figure 17 is a detail view showing the adjusting means for the pulley attached to the belt tension member;

Figure 18 is a detail sectional view taken on the line 18—18 of Figure 2, showing the construction of the friction pulley wheel attached to the compressor flywheel shaft.

Referring to the drawings in detail, 20 designates a frame or mounting which may be of any suitable construction, such as drawn tubular steel or the like. The frame is provided with wheels 21, which may be of the ball bearing pneumatic tire type, designed to support a paint or lacquer tank 22. Preferably a single paint tank is employed, but when desired a plurality of tanks or containers may be used for this purpose.

On the forward end of the frame is mounted a motor or engine 23 for driving and operating the machine. The engine is arranged to operate the adjacent compressor 24 by means of the belt 25 which is connected to the engine driving friction pulley 26 and the driven friction pulley wheel 27. The wheels 21 are driven by the friction drive pulleys 28 fixed on the outer extremities of the shaft 29, as shown in Figures 1 and 2.

The shaft 21 is journaled adjacent the pulleys 28 through the fluid operated clutches 30. Bearings 31 are provided for the shaft 29 which extends through the clutch pistons 32 reciprocating in the cylinder 33. The cylinder 33 is integral with the base 34 which is attached to the frame by means of the bolts 35. Some adjustment is provided for moving the clutches relative to the frame by means of the screw studs 35a.

The mechanism for driving the machine over the surface to be marked is illustrated in Figures 1 and 2 wherein the friction pulley 36 fixed on the outer end of the shaft 37 is driven by the compressor pulley wheel 27 fastened to the shaft 37. The pulley wheel 36 is connected by means of the belt 38 to the friction pulley 39 keyed to the countershaft 29, on which are mounted the friction driving pulley members 28. In the mechanism illustrated only one driving belt and accompanying friction pulley are shown; however, it will be understood that two or more similar driving belt and pulley means may be used.

In order to propel the machine along the surface to be marked the engine or power supply unit 23 is started which operates the air compressor 24 and at the same time drives the friction pulleys 28 on the countershaft 29 by means of the driven pulley 36, belt 38 and pulley wheel 39 keyed to shaft 29. Compressed air is thereafter admitted to the cylinders of the clutches 30 to move the revolving shaft 29 forward so that the friction pulleys 28 thereon will contact the wheels 21 to provide traction. The direction and rate of movement of the machine, of course, will depend upon the direction of rotation and R. P. M. of the friction pulleys 28.

Some variation in the traction speed of the machine is provided by making the V-type friction pulley 36 of split-wheel construction so as to permit adjustment as illustrated in Figure 18.

Compressed air is introduced into the clutch cylinders 33 by means of the pipe 40 which is connected to the cylinder head member 41 bolted to the top of the cylinder. A flexible fluid tight diaphragm 42 is clamped between the outer flanges of the cylinder and cylinder head members, as shown in Figures 3 and 4. The cylinder head member 41 is provided with central radiating slots 41a which are designed to permit the air pressure to act upon a large area of the diaphragm when the clutch is in declutched position, as illustrated in Figure 4.

Although air pressure is preferably employed for operating the clutches, it is to be understood that hydraulic fluids may be used for this purpose. For instance, suitable means for forcing a liquid through the pipe 40 to actuate the piston members 32 is contemplated.

Upon the admission of compressed air or other suitable fluid means to the piston head chamber 10 of the clutches, the diaphragm 42 is flexed to urge the piston 32 to move forward, carrying the shaft 29 journaled therein, as illustrated in Figures 3 and 4. An elongated slot 43 in the sides of the piston cylinder 33 permits movement of the shaft relative to the cylinder to bring about the engagement and disengagement of the friction driving pulleys 28 with the surface of the wheels 21.

The fluid pressure operated clutches are ordinarily maintained in declutched position by means of the spring pressed bellcrank 44. One arm of the bellcrank comprises a finger shaped member 45 which is urged in contact with the bottom of the piston 32 by the compression spring 46. This spring is positioned between the cylinder and arm 47 of the crank and tends to force the arm outward away from the cylinder, which in turn forces the arm 45 against the bottom of the piston. Attached to the outer ends of the arm 47 is a stud bolt 48 provided for varying the limit of the forward travel of the piston 32, as shown in Figures 3 and 4.

The belt tension adjusting member 49, formed integral or otherwise securely attached to one of said bellcrank members, is adapted to automatically take up the slack in the belt 38 when the clutch is operated to move the shaft 29 and pulley 39 forward. The belt tension adjuster comprises an arm 50 which preferably is formed integral with the bellcrank member 44 and extends in the opposite direction pivoting about the fulcrum 51.

On the outer end of the arm 50 is fastened an idler pulley wheel 52 which is of a shape to accommodate the belt 38. The idler pulley mounting is made fast to the flanged head member 53 formed on the end of the arm 50, by means of the nut 54 threaded on the outer end of the member 55 which is integral with the enlarged pulley shaft portion 56. The pulley is free to rotate on the enlarged shaft section 56 between the abutting shoulder member 57 and the cap 58. The latter means retains the pulley on the shaft 56.

The head member 53 has an elliptical shaped aperture 59 through which the threaded end portion 55 of the idler pulley shaft extends, providing lengthwise adjustment of the idler pulley shaft mounting. Teeth 60 formed on the flat engaging surfaces of the members 57 and 53 provide means for retaining the parts securely together when the bolthead 54 is drawn down tight.

Referring now to Figures 5 to 10, inclusive, there is illustrated the fluid or air curtain guide members 61, which forms one of the principal features of this invention. As shown in Figure 1, the air curtain guides 61 are located one on each side of the depending nozzle 62 attached to the undercarriage of the machine through which paint, lacquer or other marking material is delivered in a narrow angled spray stream onto the surface therebeneath.

The fluid curtain guides, as shown in Figures 9 and 10, comprise elongated, narrow, hollow, funnel shaped members having a web 63 extending across the opening near the outer end, and at the center of which is formed the rectangular opening or slot 64. The side walls 65 of the slot are formed parallel and at right angles to the transverse axis of the opening, while the end walls 66 are cut on a bias. The web 63 comprising the rectangular slot is countersunk from the outer end to provide an outward flared, V-shaped exit 67, as shown in Figure 9.

The air curtains are mounted on the manifold 68 by means of the bolt 69 which extends through the neck of the curtain member into the back wall of the manifold, as illustrated in Figure 8. Exhaust gas is conducted to the manifold 68 by the pipe 70, which in turn is connected to the exhaust of the engine 23. Compressed air, gas, or suitable fluid, may be supplied to the guide curtains from a compressor, as shown, fan, or other suitable means, for delivering gas or fluid under pressure. It is preferable to employ exhaust gas from the engine for this purpose. In some instances liquids may be used in place of exhaust gases or air. The liquid selected preferably is substantially immiscible with the marking material so as not to cause "bleeding" or running of the mark.

Provision is made for raising and lowering the air curtain members which are attached to the manifold 68, by moving the manifold up or down on the vertical guide members 71 in response to the adjustment of the wing nut member 72 with respect to the supporting plate 73. Compression springs 74 are provided on the guide members 71 between the manifold 68 and supporting plate 73 to maintain the manifold and accompanying air curtain means taut at all times. Likewise the nozzle members 62 are provided for adjustment on the supporting rod 75 by means of the longitudinal slots 76 and the upstanding end guide members 77. Supporting rod 75 is maintained in position on the guide members 77 by tightening of the screws 78. The limit of vertical adjustment of the rod 75 may be provided by the positioning of the lugs 79 on the guides 77.

By the use of air curtains in the operation of the marking machine of this invention, there is produced a decided improvement in laying down sharply defined lines over the use of disks or dragging plates heretofore employed for this purpose. When using disks or plates, paint gathers on the disk and drips off after the operator ends a line, which results in a spattered trailing out of the line. Further dripping off of the paint from the disk occurs during the painting of the line causing poor cross distribution, that is, piling up of the paint at the edges of the marking. This is both wasteful of paint and results in an imperfectly formed line. Aside from this, on pavements which are rough or wavey, paint passes under the guide plates making an ill defined, fuzzy line.

All of the above defects are overcome by the employment of an air curtain on each side of the paint spray nozzle for confining the spreading of the paint. As shown in Figure 9, the nozzles 61 through which the exhaust gases, or compressed air, pass, forming the gas curtains 80, are located high enough to be substantially out of range of the paint spray 81 so that large quantities of paint cannot gather on them. In this way only an inconsequential amount of mist from the spray, as indicated at 82, on Figure 9, collects on these nozzles, and this dries instantly so that no dripping off of paint from the air curtain nozzles occurs. Thus paint is conserved and no fuzzy edged lines are produced.

The air curtains also confine the paint spray just as effectively on rough surfaces or in depressions as on smooth pavement and the like, so that regardless of the road conditions a sharply defined line is produced. Due also to the particular shape of the air curtain nozzle, a concentrated volume of air can be directed into the outer portion of the paint spray onto the surface to maintain the edges of the line perfectly straight and well defined.

The paint spray nozzles or atomizers and air curtain members will be preferably placed at one side of the machine frame and to the front so that a person operating the marker can walk along the side of the line laid down by the spray nozzles. Handle bars 83 will be provided for directing the operation of the machine, and the forward or front end of the machine will be supported by a single or double wheel, not shown. The steering of the machine is effected by applying pressure to one or the other handle bars to slightly tilt the apparatus in order to cause it to move in a curve when necessary.

An important feature in the operation of this machine is the locking together of the traction wheels by the fluid operated friction pulleys, as heretofore mentioned. It is by this means that the wobbling of the machine over rough surfaces is prevented and the operator can easily lay down straight, sharply defined lines or markings.

An air cylinder or manifold 84 is positioned between the handle bars. Connected to the air cylinder is an air pipe or conduit 85 to supply compressed air from the compressor to the cylinder 84. Air pipes or conduits 86 connect the air supply cylinder 84 with the paint atomizers or nozzles 62. These nozzles are provided with hand operated cut-off valves adjacent the air cylinder 84 for convenience of the operator.

The paint tank or container is likewise supplied with compressed air through the pipe 88 on which the hand valves 89 and 90 are placed for admitting and releasing the air from the container, respectively. Each of the air pipes is preferably provided with pressure gages and needle valve adjusting means 91. Compressed air is supplied to the conduit 40 from the air cylinder 84 by means of the conduit 92 which is controlled by the hand operated valve 93.

Paint is supplied from the tank 22 to the nozzle 62 by means of the pipes 94 which are controlled by globe valves 95. A paint line drain is connected to the bottom of the paint supply tank, as at 96, and includes the outlet valve 97 for drawing off the paint from the container. For maintaining the paint or marking liquid agitated during use, compressed air is introduced into the bottom of the tank from the compressor through the pipe 98. Mechanical agitators, optionally, may be used.

Paint volume control means is illustrated in Figures 12 and 13 and comprises a rod 99 which is attached to the hand lever 100 by means of the crank arm 101. The end of the rod 99 is threaded and extends through the outer portion of the arm 101 receiving the adjusting lock nuts 102. The hand lever is secured to the handle bars 83 as shown at 103 in Figure 13.

The opposite end of the rod 99 is attached to the crosshead bar 104 which carries the interspray head volume control members 105. These inter-spray head members are constructed of an outer flexible tubing having an inner rod 106 extending to the paint sprayhead nozzles 62 providing means for opening and closing the spring pressed nozzle needle valve conventionally employed in paint spray nozzles. This arrangement provides finger-tip control by the operator and enables him to cut off and on, at will, the paint spray so as to produce intermittent lines while the machine is in motion. Where the curtain guide means are supplied with air or gas from the exhaust, it is unnecessary to provide means for connecting and disconnecting the exhaust fluid supplied thereto; this, of course, is optional.

The fluid operated clutches controlled by the valve 93 comprise a two-way valve member rotatable by the hand lever 107 and allow the operator to either connect the air line from the air compressor manifold 84 to the clutches or release the air to the atmosphere therefrom, as shown in Figure 15. On release of the compressed air from the clutch cylinders the friction pulleys engaging the wheels 21 will be automatically disengaged, stopping the machine.

A pressure gage 108 is attached to the air compressor feed line pipe 85 which is connected to the air leveler chamber or manifold 84 to indicate the air line pressure. Adjacent the gage is a relief valve 109 which is also provided with a hand tripping means 110 for lowering the air pressure when desired.

In the construction of the marking device shown in the instant drawings, a double line marking machine is provided but it will be appreciated that the machine can be readily adjusted to lay down one or more lines. Further by using several tanks comprising different colored paint or lacquer, two or more strips may be painted at one time. These lines or strips can be placed adjacent each other or separated by adjusting the paint spray atomizers or nozzles 62.

It is believed that in view of the above disclosure, a clear understanding of the construction, operation and utility of the marking machine of this invention will be readily apparent without further detailed description.

It will be further understood that obvious modifications may be made in the construction of the machine by persons skilled in the art without departing from the spirit of this invention.

Having thus fully described our invention, what we claim as new and desire to secure by Letters Patent is:

1. A machine for applying marking material to a flat surface such as a road surface comprising a chassis, a manifold mounted on said machine transverse to the line of travel of said machine over said surface, a paint spray mechanism mounted on said machine having at least one paint striping nozzle mounted above and adjacent to said surface, a plurality of fluid nozzle members, means for pivotally connecting said last named nozzles on said manifold on either side of said paint nozzle to provide a gas curtain on either side thereof, and means providing for lateral adjustment of said nozzles on said manifold toward and away from said paint nozzle and substantially transverse of the line of travel of said machine.

2. A machine for applying marking material to a flat surface such as a road surface comprising a chassis, a manifold mounted on said machine transverse to the line of travel of said machine over said surface, a paint spray mechanism mounted on said machine having at least one paint striping nozzle mounted above and adjacent to said surface, a plurality of fluid nozzle members, means for pivotally connecting said last named nozzles on said manifold on either side of said paint nozzle to provide a gas curtain on either side thereof, and means providing for lateral adjustment of said nozzles on said manifold toward and away from said paint nozzle and substantially transverse of the line of travel of said machine, and means mounting said manifold for vertical adjustment toward and from said road surface.

3. A machine for applying marking material to a flat surface such as a road surface comprising a chassis, a manifold mounted on said machine transverse to the line of travel of said machine over said surface, a paint spray mechanism mounted on said machine having at least one paint striping nozzle mounted above and adjacent to said surface, a plurality of fluid nozzle members, means for pivotally connecting said last named nozzles on said manifold on either side of said paint nozzle to provide a gas curtain on either side thereof, and means providing for lateral adjustment of said nozzles on said manifold toward and away from said paint nozzle and substantially transverse of the line of travel of said machine, and means mounting said manifold for vertical adjustment toward and from said road surface, said last named means including vertical guide members and spring means for spacing said manifold from another part of said mounting means.

PAUL H. CRESWELL.
ROBERT A. KELLY.